(12) United States Patent
Kahr

(10) Patent No.: US 11,927,296 B2
(45) Date of Patent: Mar. 12, 2024

(54) MACHINE FRAME FOR A MACHINE TOOL AND MACHINE TOOL

(71) Applicant: Bystronic Laser AG, Niederönz (CH)

(72) Inventor: Christian Kahr, Suhr (CH)

(73) Assignee: BYSTRONIC LASER AG, Niederonz (CH)

( * ) Notice: Subject to any disclaimer, the term of this patent is extended or adjusted under 35 U.S.C. 154(b) by 0 days.

(21) Appl. No.: 17/912,062

(22) PCT Filed: Mar. 29, 2021

(86) PCT No.: PCT/EP2021/058122
§ 371 (c)(1),
(2) Date: Sep. 16, 2022

(87) PCT Pub. No.: WO2021/204575
PCT Pub. Date: Oct. 14, 2021

(65) Prior Publication Data
US 2023/0120759 A1  Apr. 20, 2023

(30) Foreign Application Priority Data
Apr. 6, 2020 (EP) .................................... 20168327

(51) Int. Cl.
*F16M 1/00* (2006.01)
*B23K 37/02* (2006.01)
*F16M 7/00* (2006.01)

(52) U.S. Cl.
CPC ........... *F16M 1/00* (2013.01); *B23K 37/0235* (2013.01); *F16M 7/00* (2013.01)

(58) Field of Classification Search
CPC .. F16M 1/00; F16M 1/08; F16M 5/00; F16M 7/00; F16M 9/00; B23K 37/0235
(Continued)

(56) References Cited

U.S. PATENT DOCUMENTS 3,215,897 A * 11/1965 Hertig ...................... H02B 5/00
361/602
3,843,281 A * 10/1974 Meylan .................... F16M 1/04
415/213.1
(Continued)

FOREIGN PATENT DOCUMENTS

| DE | 10017507 A1 | 10/2001 |
| DE | 102007028446 A1 | 12/2006 |
| WO | WO2004/090413 A1 | 10/2004 |

OTHER PUBLICATIONS

DE102007028446A1 English language machine translation.
(Continued)

*Primary Examiner* — Jonathan Liu
*Assistant Examiner* — Guang H Guan
(74) *Attorney, Agent, or Firm* — BelayIP

(57) ABSTRACT

A machine frame for a machine tool is disclosed having two longitudinal members running in a first direction and two transverse members connecting the longitudinal members and running in a second direction running transversely to the first direction, wherein the longitudinal members and the transverse members define a machining space for the machine tool, at least two, preferably at least four, first floor fastening units for the predominant transmission of forces in the first direction into a foundation, wherein the first floor fastening units are fastened to end regions of the longitudinal members, and at least two second floor fastening units for the predominant transmission of forces in the second direction into the foundation, wherein the second floor fastening units are fastened to at least one of the longitudinal members in its central region, wherein the at least one of the longitudinal members has a cross-sectional geometry for the predominant force transfer in the second direction.

9 Claims, 3 Drawing Sheets

(58) Field of Classification Search
USPC ........ 248/500, 675, 676, 677, 678, 679, 680
See application file for complete search history.

(56) References Cited

U.S. PATENT DOCUMENTS

| | | | | |
|---|---|---|---|---|
| 4,046,354 A * | 9/1977 | Stith, Jr. | ................... | F16M 7/00 254/93 R |
| 4,173,329 A * | 11/1979 | Stith, Jr. | ................... | F16M 7/00 254/93 R |
| 4,731,915 A * | 3/1988 | Holder | ..................... | F16M 7/00 264/31 |
| 4,989,826 A | 2/1991 | Johnston, Jr. | | |
| 5,460,348 A | 10/1995 | Cox | | |
| 8,253,064 B2 * | 8/2012 | Beck | .................. | B23K 26/0846 219/121.72 |
| 8,616,517 B2 * | 12/2013 | Huth | ..................... | F04D 29/605 248/677 |
| 8,960,620 B1 * | 2/2015 | Merideth | ............... | F16M 13/02 248/676 |
| 9,003,622 B2 * | 4/2015 | Kweon | .................. | B62D 65/02 29/281.4 |
| 9,120,176 B2 * | 9/2015 | Nishiyama | ......... | B23K 37/0533 |
| 9,332,670 B1 * | 5/2016 | Eichelberg | .............. | G06F 1/182 |
| 10,059,249 B2 * | 8/2018 | Reddy Asani | ............ | B60P 3/00 |
| 10,060,447 B2 * | 8/2018 | Nelson | ................... | F04D 29/605 |
| 10,625,383 B2 * | 4/2020 | Bütikofer | ............. | B23Q 1/0054 |
| 10,648,056 B2 * | 5/2020 | Domínguez | ............. | C21D 1/09 |
| 11,125,114 B2 * | 9/2021 | Menchicchi | ............. | F16M 1/04 |
| 2004/0261331 A1 * | 12/2004 | Kilibarda | ................. | F16M 7/00 52/155 |
| 2010/0025179 A1 * | 2/2010 | Behrens | ................... | F16M 5/00 192/76 |
| 2017/0066590 A1 * | 3/2017 | Albanese | .......... | B65D 90/0006 |
| 2017/0216964 A1 * | 8/2017 | Vlaev | ................ | B23K 37/0235 |
| 2018/0050629 A1 | 2/2018 | Reddy Asani et al. | | |
| 2018/0369944 A1 * | 12/2018 | Fedyk | ..................... | B23K 3/08 |
| 2019/0381566 A1 * | 12/2019 | De Chirico | ........ | B23K 37/0235 |
| 2023/0120759 A1 * | 4/2023 | Kähr | ..................... | B23K 26/38 248/637 |

OTHER PUBLICATIONS

DE10017507A1 English language machine translation.
WO2004/090413A1 English language machine translation.
PCT/EP2021/058122 International Preliminary Report on Patentability and Letter Accompanying Amendments Under Article 34 PCT (dated Jan. 18, 2022).

* cited by examiner

MACHINE FRAME FOR A MACHINE TOOL AND MACHINE TOOL

CROSS REFERENCE TO RELATED APPLICATIONS

This application is a national stage filing of PCT/EP2021/058211, filed on Mar. 29, 2021, which claims priority to European patent application 20168327.3, filed on Apr. 6, 2020, the content of both of which is herein incorporated by reference.

BACKGROUND OF THE INVENTION

Field of the Invention

The present disclosure relates to a machine frame for a machine tool and a machine tool having a machine frame.

Description of Related Art

A machine tool is used to manufacture and machine workpieces using tools. Machine tools here are, for example, laser machining tools, in particular laser cutting tools for cutting plate-shaped or cylindrical workpieces. For the sake of clarity, reference is made below to laser cutting tools.

All known machine frames have floor fastenings which fix the frame in a first, X, and a second, Y, direction. A plurality of these floor fastenings is attached to the frame. In the X-direction, all floor fastenings transfer forces into the foundation, regardless of the position at which the machine is cutting at that point. On the other hand, in the Y-direction, these floor fastenings mainly transfer the forces where the bridge of the machine is currently located. This is due to the long, narrow shape of the side parts.

In the case of short machines that have fewer floor fastenings, the fixation in the X-direction is often not sufficient. In the case of very long machines, however, the floor fastenings in the X-direction are then oversized.

Document U.S. Pat. No. 4,989,826 A discloses a frame for the support of equipment upon a substantially horizontal roof. The frame comprises two longitudinal members connected by several transverse members having legs with base elements fastened at the roof.

Document WO 2004/090413 A1 discloses a frame consisting of longitudinal beams and transverses which is used for bearing units.

Document DE 10 2007 028 446 A1 describes a frame for supporting a transmission motor unit, the frame having a longitudinal profile pipe. Each end of the profile pipe is connected with a transverse sheet. The profile pipe comprises fastening units for fastening the frame on a mounting surface.

BRIEF SUMMARY OF THE INVENTION

An object of the present disclosure is to avoid the disadvantages of the prior art and to provide an improved machine frame for a machine tool or an improved machine tool.

The machine frame for a machine tool comprises
two longitudinal members running in a first direction and two transverse members connecting the longitudinal members and running in a second direction running transversely to the first direction, wherein the longitudinal members and transverse members define a machining space for the machine tool,
at least two, preferably at least four, first floor fastening units for the predominant transmission of forces in the first direction into a foundation, wherein the first floor fastening units are fastened to ends of the longitudinal members, and
at least two second floor fastening units for the predominant transmission of forces in the second direction into a foundation, wherein the second floor fastening units are fastened to at least one of the longitudinal members in its central region, wherein
one, preferably exactly one, longitudinal member to which the second floor fastening units are fastened has a cross-sectional geometry for the predominant force transfer in the second direction,
the cross-sectional geometry has a triangular cross-section with an angled outer panel and/or an angled inner panel, where a surface element is inserted into the cross-section in a force-fitting manner,
the second floor fastening unit has an inner floor fastening arranged in the machining space and an outer floor fastening arranged outside the machining space, wherein the surface element connects the two floor fastenings and wherein the floor fastenings and the surface element are arranged in a plane perpendicular to the longitudinal member.

The longitudinal member usually has a longer extension than the transverse member, so that a rectangular machining space is spanned. A square machining space with longitudinal members and transverse members of the same length is also possible. Generally, the longitudinal members and transverse members can be referred to as first and second members that extend in a first and second direction. The first or X-direction and the second or Y-direction form a horizontal plane.

In the case of laser cutting tools with lower laser power, for example, the machine frame can have additional, internal transverse members in the machining space. The term machining space here includes both free machining spaces, i.e. without internal transverse members, and machining spaces with one or a plurality of internal transverse members.

The machine frame is optimised for transferring the forces to feet or floor fastenings, in particular in the Y-direction. The two different floor fastening units are used for the predominant transmission of forces and/or torques in a preferred direction (X, Y) into a foundation or the floor and are therefore designed for the most rigid possible fixation in a specific direction. The predominant transmission or force transfer means that more than 50%, preferably more than 80%, most preferably greater than or equal to 90% of the forces are transmitted in the specific direction (X, Y). At the same time, forces in the other direction (Y, X) can be transmitted to a lesser extent, for example 10% to 20%. In particular with a predominant transmission of greater than or equal to 90%, i.e. with only a proportion of the other force of 10 or less percent, the floor fastening units can be optimised greatly for the respective force. This enables an optimised structure of the entire machine frame. A torque about the first X-direction is also mainly absorbed by the second floor fastening units. For the torque, the term predominantly means that more than 80%, preferably greater than or equal to 85% of the torques about the specific X-direction are transmitted by the second Y floor fastening units.

The machine frame according to the invention for a machine tool has the advantage that the part accuracy of the machine tool can be increased, since the rigidity of the machine frame itself and its floor fastening have a considerable influence on the part accuracy. Furthermore, the increased rigidity avoids a limitation of the maximum control gain, which can otherwise lead to resonance problems and vibrations.

In the case of uneven foundations, the structure of the machine frame can prevent high stresses from being applied to the machine frame and prevent said machine frame being distorted when it is screwed into the floor. The problem can also be minimised if a machine frame does not have the required straightness after assembly. Then it would have to be pushed into the correct position by devices.

It can be provided that the cross-sectional geometry has a triangular cross-section with an angled outer panel and/or an angled inner panel and that a surface element is inserted into the cross-section in a force-fitting manner. Such a cross-sectional geometry is particularly well suited, by widening the base of the longitudinal member, to divert forces preferably in the specific second or X-direction. This structure provides a maximum geometrical moment of inertia and thus maximum rigidity. This also results in a closed profile for optimal torsional rigidity. The gradient of the outer panel and/or the inner panel can have an angle between 15 and 45 degrees to the vertical (Z-direction). The slope can be formed over the entire length or only in places where higher forces occur. The structure of the Y floor fastening according to the invention allows an optimal power transmission. The surface element is a full-surface element such as a plate or rib and extends in the plane.

It can be provided that at least one surface element is arranged between the inner panel and the outer panel in a structure-reinforcing manner. Such a surface element allows maximum rigidity and optimal torsional rigidity.

It can further be provided that the second floor fastening unit has an inner floor fastening arranged in the machining space and an outer floor fastening arranged outside the machining space, wherein the at least one surface element connects the two floor fastenings and wherein the floor fastenings and the surface element are arranged in a plane perpendicular to the longitudinal member.

It can be provided that the floor fastening has a leg (first leg) that can be screwed to the longitudinal member. The screw connection allows easier production and handling.

Furthermore, it can be provided that the floor fastening is arranged on a leg of the surface element (second leg), wherein the leg protrudes from the longitudinal member. The extension of the surface element beyond the outer surface of the longitudinal member can further increase the rigidity.

It can be provided that the leg is connected to a floor element which can be fastened to the foundation via two elongated holes and corresponding screw connections. The height can be adjusted through the elongated holes formed in one part, preferably in the Z-direction. This connection also allows the angle (about X) to be adjusted, so that uneven floors can be compensated for. The angle about Y does not have to be adjusted separately, as the legs allow a certain amount of rotation about Y due to their relatively elastic properties (thickness of the legs is thin compared to the size of the machine frame).

Furthermore, it can be provided that adjusting screws, which are in contact with a floor element that can be fastened to the foundation and is fastened to the leg, are provided on both sides of the leg. For example, the outer leg can comprise two screws which can push the longitudinal member in both directions for alignment. The two adjusting screws can be arranged to the left and right of the main surface of the leg or, in other words, run and act in the Y-direction.

A machine tool according to the invention is designed for machining workpieces in a machining space and comprises a machine frame as described above. The same advantages and modifications apply as described above. The number of first or X floor fastenings can be the same for all machine sizes because the force in X always occurs at the same Y-point and the longitudinal member is intrinsically very stiff in the X-direction. The number and/or position of the second or Y floor fastenings can be defined on the basis of the machine size and/or the calculated torques and forces. The distance between 2 second or Y floor fastenings is, for example, 1000-1500 mm.

Furthermore, it can be provided that the machine tool has a portal element which can be moved in the machining space in the X-direction and Y-direction. Especially with movable bridges or portals, dynamic torques and forces arise that can be absorbed very well by the machine frame or the machine tool proposed here, which improves the part accuracy.

It can also be provided that the machine tool is a laser machining tool and that the portal element is a laser cutting head arranged on a bridge. In laser machining, for example laser cutting, a high level of accuracy and precision is required. The machine frame or the machine tool can guarantee this through the rigidity of the machine frame itself and its floor fastening.

Further preferred embodiments of the invention will become apparent from the remaining features mentioned in the dependent claims.

The various embodiments of the invention mentioned in this application can, unless otherwise stated in individual cases, be advantageously combined with one another.

BRIEF DESCRIPTION OF THE SEVERAL VIEWS OF THE DRAWING

Further advantages features and details of the various embodiments of this disclosure will become apparatus from the ensuing description of a preferred exemplary embodiment or embodiments and further with the aid of the drawings. The features and combinations of features recited below in the description, as well as the features and feature combination shown after that in the drawing description or in the drawings alone, may be used not only in the combination recited but also in other combinations on their own without departing from the scope of the disclosure.

The invention will be explained below in exemplary embodiments with reference to the accompanying drawings. In the figures.

DETAILED DESCRIPTION OF THE INVENTION

As used throughout the present disclosure, unless specifically stated otherwise, the term "or" encompasses all possible combinations, except where infeasible. For example, the expression "A or B" shall mean A alone, B alone, or A and B together. If it is stated that a component includes "A, B, or C", then, unless specifically stated otherwise or infeasible, the component may include A, or B, or C, or A and B, or A and C, or B and C, or A and B and C. Expressions such as "at least one of" do not necessarily modify an entirety of the following list and do not necessarily modify each member of the list, such that "at least one of "A, B, and C" should be understood as including only one of A, only one of B, only one of C, or any combination of A, B, and C.

Figure 1:
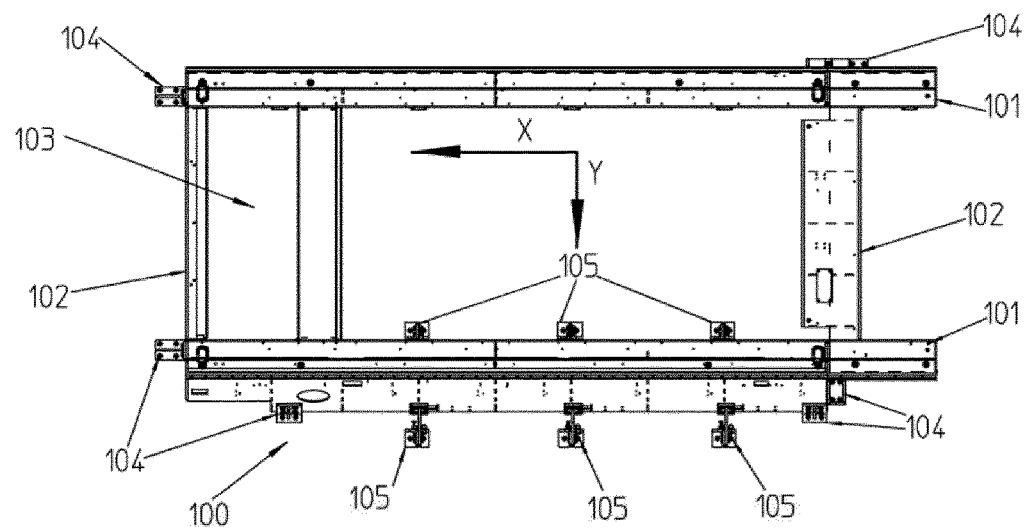
FIG. 1 shows a top view of a machine frame for a machine tool.

FIG. 1 shows a top view of a machine frame 100 for a machine tool. The machine frame 100 has two parallel longitudinal members 101 running in a first or X-direction. The two longitudinal members 101 are each connected in their end regions via a transverse member 102, wherein the transverse members 102 extend in a second or Y-direction. The four members span a machining space 103 for the machine tool in the X-Y plane. For the sake of clarity, the coordinate X is used for the first direction and Y for the second direction.

The machine frame 100 forms the base for a machine tool, for example in the form of a laser cutting tool. A machine tool with a machine frame 100 is described below with reference to FIG. 1.

The machine frame 100 comprises at least two X floor fastening units 104 for the predominant transmission of forces and/or torques in the X-direction into a foundation, such as a factory floor. Four of the X floor fastening units 104 are fastened in end regions of the longitudinal members 101. The X floor fastening units 104 are preferably arranged close to the introduction of force in the region of the transverse members 102. Further X floor fastening units 104 can be arranged in the central regions and/or in the end regions of the longitudinal members 101.

The machine frame 100 further comprises at least two Y floor fastening units 105 for the predominant transmission of forces and/or torques in the Y-direction into a foundation, wherein the Y floor fastening units 105 are fastened to at least one of the longitudinal members 101 in the central region thereof. The Y floor fastening units 105 are preferably arranged in a machining region or cutting region of the machine tool. The Y floor fastening units 105 are preferably fastened to only one of the longitudinal members 101; only this longitudinal member 101 has a fixed position, while the second longitudinal member 101 is then elastically connected. In the view in FIG. 1, the lower longitudinal member 101 has a fixed position.

For example, the movement of a portal or a bridge with a laser cutting head or the like creates forces and/or torques that are diverted into the foundation via the machine frame 100.

According to the machine frame 100, these forces and/or torques are derived specifically. This means that the X floor fastening units 104 mainly dissipate the forces in the X-direction, while the Y floor fastening units 105 mainly dissipate the forces in the Y-direction. This division allows an optimised and modular design of the machine tools. The floor fastening units 104 and 105 preferably absorb at least 90% of the respective forces in the first (X) or second (Y) direction.

Figure 2:
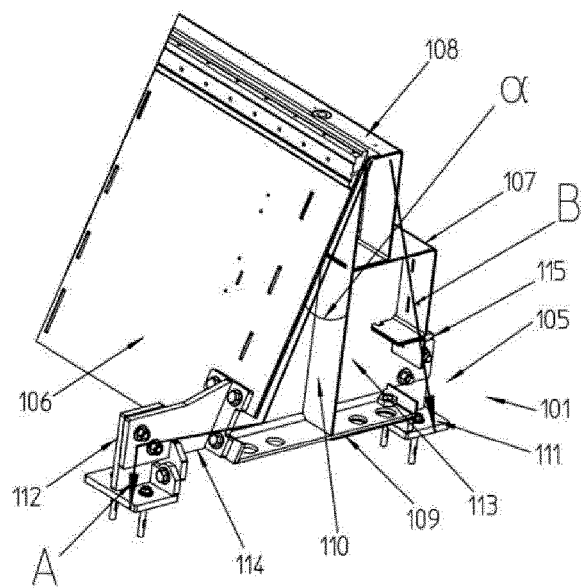
FIG. 2 shows a perspective sectional view of a longitudinal member of the machine frame.

FIG. 2 shows a perspective sectional view of the longitudinal member 101 of the machine frame 100. The longitudinal member 101 is shown with a Y floor fastening unit 105.

The longitudinal member 101 has a cross-sectional geometry with a triangular cross-section, here with an angled outer panel 106 and a step-shaped inner panel 107. The inner panel 107 can consist of one or a plurality of parts and also follows an angled line starting from a tip 108 of the longitudinal member 101 to a base 109 of the longitudinal member 101. The outer panel 106, the inner panel 107 and the base 109 form at least approximately a triangle.

The outer panel 106 is preferably formed in one piece and runs at an angle between 15 and 45 degrees to the vertical (Z-direction) or to a central, vertical stiffening rib 110 of the longitudinal member 101. The angle between 15 and 45 degrees to the vertical (Z-direction) or to the central, vertical stiffening rib 110 is marked in FIG. 2 as α.

The Y floor fastening unit 105 comprises or consists of an inner floor fastening 111 arranged in the machining space, an outer floor fastening 112 arranged outside the machining space and a surface element 113 connecting the two floor fastenings. The floor fastenings and the surface element 113 are arranged in a plane perpendicular to the longitudinal member 101. The surface element 113 is inserted into the cross-section of the longitudinal member 101 in a force-fitting manner.

The surface element 113 is preferably a panel and can be referred to as a transverse rib.

The outer floor fastening 112 comprises a (first) leg 114 that can be screwed to the longitudinal member 101. The leg 114 extends in the Y-direction and is fastened in the region of the base 109 of the longitudinal member 101. The leg 114 thus extends the base or the contact surface of the longitudinal member 101.

The inner floor fastening 111 is arranged on a (second) leg 115 of the surface element 113, wherein the leg 115 protrudes from the longitudinal member 101. The leg 115 thus also extends the base or the contact surface of the longitudinal member 101. Both the outer floor fastening 112 and the inner floor fastening 111 can each have a screwable leg or be arranged on a leg 115 of the surface element 113.

The floor fastenings serve to introduce forces and/or torques of the longitudinal member 101 into a foundation or to fasten and hold a machine frame or a machine tool. A force that is introduced in the region of the tip 108 of the longitudinal member 101 is first divided into two partial forces A and B and then transmitted in the longitudinal member 101 to its base 109. This is done in particular by the outer panel 106 and the inner panel 107, but also by the surface element 113.

Then the two partial forces A and B are diverted via the legs 114, 115 or the inner floor fastening 111 and the outer floor fastening 112 into a foundation (not shown).

Figure 3:
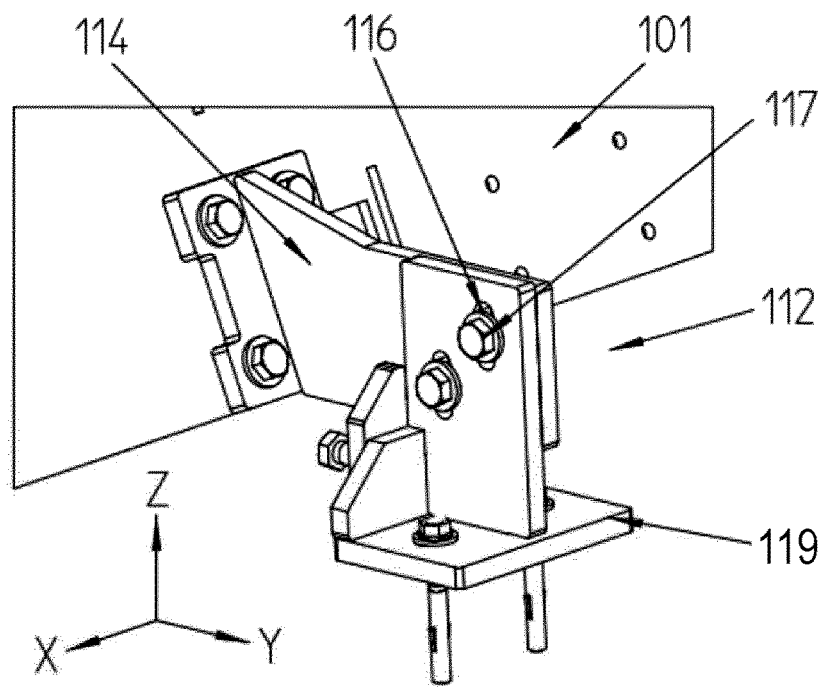
FIG. 3 shows a perspective view of a leg with the floor fastening.

FIG. 3 shows a perspective view of an outer floor fastening 112 with a leg 114 with a floor element 119 fastened thereto. The floor element 119 can be fastened to the foundation with screws and dowels, for example.

The leg 114 and the floor element 119 are fastened to one another via two elongated holes 116 and corresponding screw connections 117. The elongated holes 116 extend in the Z-direction, so that the machine frame can be adjusted in height (Z-direction). This connection also allows the angle about X to be adjusted to compensate for uneven floors.

Figure 4:
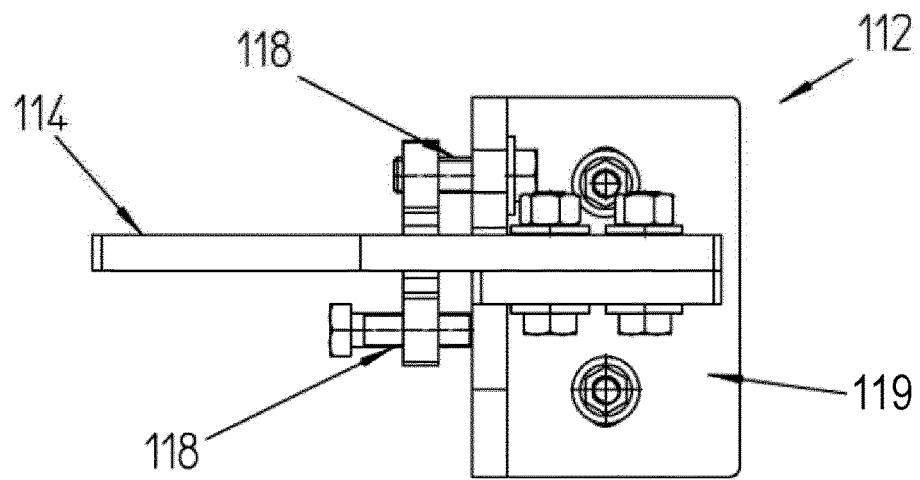
FIG. 4 shows a top view of the leg with the floor fastening.

FIG. 4 shows a top view of the outer floor fastening 112 with a leg 114 with a floor element 119 fastened thereto.

Adjusting screws 118 which are in contact with a floor element 119 that is fastened to the leg 114, are provided on both sides of the leg 114. The two adjusting screws 118 can push the side part in both directions for alignment. For this purpose, for example, a vertical projection can be formed on the floor element 119 as a counter bearing to the adjusting screws 118.

Figure 5:
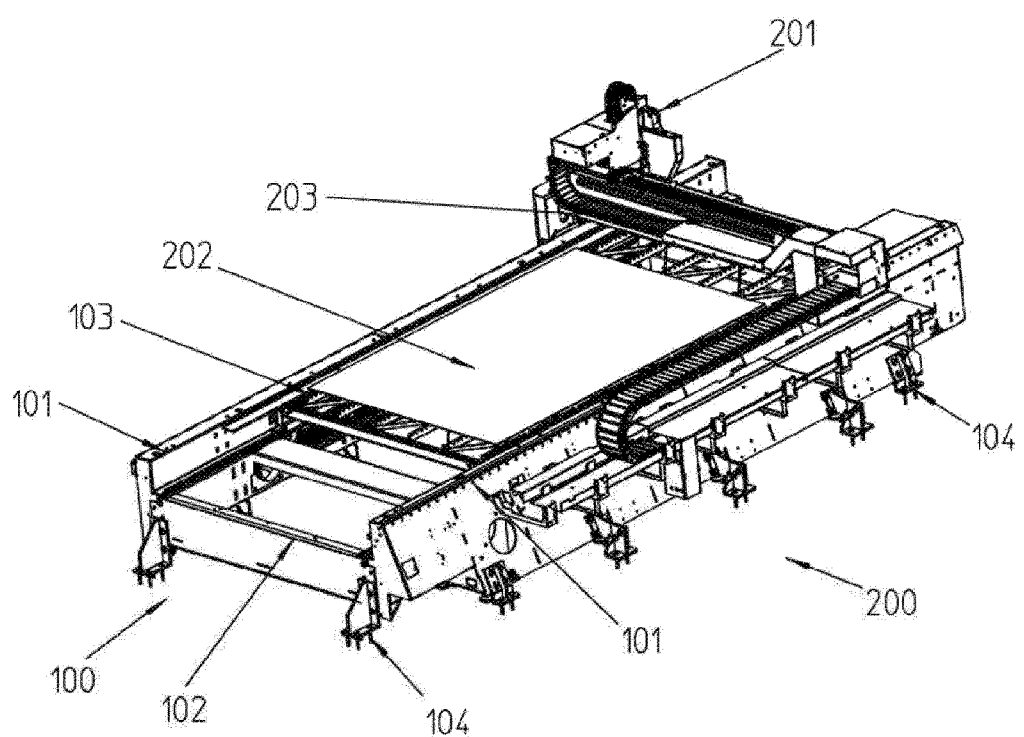
FIG. 5 shows a perspective view of a machine tool with a machine frame.

FIG. 5 shows a perspective view of a machine tool in the form of a laser cutting tool 200 with a machine frame 100. The machine frame 100 has two longitudinal members 101 and two transverse members 102.

The laser cutting tool 200 comprises a laser cutting head 201 configured for cutting parts from a metallic workpiece 202 that is plate-shaped in this case. For this purpose, a laser cutting power in the range of usually at least 1 kW, preferably greater than or equal to 3 kW, is provided. The laser cutting head 201 is arranged on a bridge 203 that can be moved in the machining space 103 in the X-direction and Y-direction.

A changing table of the laser cutting tool 200 for receiving at least one workpiece 202 can be provided in the machining space 103 or workpiece region. The changing table here can correspond to the machining space, or the machining space of the laser cutting tool 200 or the machine frame 100 is limited by the dimensions of the changing station.

The bridge 203 or a portal can move on or to the two longitudinal members 101. The movable portal can move on rails which are attached to the longitudinal members 101

The machine frame according to the invention for a machine tool has the advantage that the part accuracy of the machine tool can be increased, since the rigidity of the machine frame itself and its floor fastening have a considerable influence on the part accuracy.

Some advantageous embodiments of the device according to the invention have been described above. The invention is however not limited to the embodiments described above, but the inventive idea can be applied in numerous ways within the scope of the claims.

The invention claimed is:

1. A machine frame for a machine tool, comprising:
two longitudinal members running in a first direction,
two transverse members connecting the longitudinal members and running in a second direction running transversely to the first direction, wherein the longitudinal members and the transverse members define a machining space for the machine tool,
at least two or at least four first floor fastening units configured to predominantly transmit forces in the first direction into a foundation, wherein the first floor fastening units are fastened to end regions of the longitudinal members, and
at least two second floor fastening units configured to predominantly transmit forces in the second direction into the foundation, wherein at least one of the second floor fastening units is fastened to a central region of at least one of the longitudinal members, and wherein:
the at least one of the longitudinal members has a cross-sectional geometry for a predominant force transfer in the second direction, the cross-sectional geometry having at least approximately a triangular cross-section with a step-shaped inner panel and/or an angled outer panel with respect to a vertical direction, wherein a surface element is inserted into the cross-section in a force-fitting manner, and
the at least one of the second floor fastening units has an inner floor fastening arranged in the machining space and an outer floor fastening arranged outside the machining space, wherein the surface element connects the inner floor fastening and the outer floor fastening, and wherein the surface element extends in a plane perpendicular to the first direction.

2. The machine frame for a machine tool according to claim 1, wherein the surface element is arranged between the inner panel and the outer panel in a structure-reinforcing manner.

3. The machine frame for a machine tool according to claim 1, wherein the outer floor fastening has a leg configured to be screwed to the at least one of the longitudinal members.

4. The machine frame for a machine tool according to claim 1, wherein the inner floor fastening is arranged on a leg of the surface element, and wherein the leg protrudes from the at least one of the longitudinal members.

5. The machine frame for a machine tool according to claim 1, wherein a leg is connected to a floor element via two elongated holes and screw connections corresponding to the elongated holes, and wherein the floor element is configured to be fastened to the foundation.

6. The machine frame for a machine tool according to claim 1, wherein a floor element is fastened to a leg and configured to be fastened to the foundation, and wherein adjusting screws are in contact with the floor element and arranged on both sides of the leg.

7. A machine tool designed for machining workpieces in a machining space, the machine tool comprising:
two longitudinal members running in a first direction,
two transverse members connecting the longitudinal members and running in a second direction running transversely to the first direction, wherein the longitudinal members and the transverse members define the machining space for the machine tool,
at least two or at least four first floor fastening units configured to predominantly transmit forces in the first direction into a foundation, wherein the first floor fastening units are fastened to end regions of the longitudinal members, and
at least two second floor fastening units configured to predominantly transmit forces in the second direction into the foundation, wherein at least one of the second floor fastening units is fastened to a central region of at least one of the longitudinal members, and wherein:
the at least one of the longitudinal members has a cross-sectional geometry for a predominant force transfer in the second direction, the cross-sectional geometry has at least approximately a triangular cross-section with a step-shaped inner panel and/or an angled outer panel with respect to a vertical direction, wherein a surface element is inserted into the cross-section in a force-fitting manner,
the at least one of the second floor fastening units has an inner floor fastening arranged in the machining space and an outer floor fastening arranged outside the machining space, wherein the surface element connects the inner floor fastening and the outer floor fastening, and wherein the surface element extends in a plane perpendicular to the first direction.

8. The machine tool according to claim 7, further comprising a portal element configured to be moved in the machining space in the first direction and the second direction.

9. The machine tool according to claim 8, wherein:
the machine tool is a laser machining tool; and
the portal element is a laser cutting head arranged on a bridge.

* * * * *